United States Patent [19]

Aoki et al.

[11] Patent Number: 5,041,271

[45] Date of Patent: Aug. 20, 1991

[54] METHOD OF TREATING WASTE GAS BY IRRADIATION WITH ELECTRON BEAM

[75] Inventors: Shinji Aoki, Tokyo; Yoshio Hirayama; Akihiko Maezawa, both of Kanagawa, all of Japan

[73] Assignee: Ebara Corporation, Tokyo, Japan

[21] Appl. No.: 532,817

[22] Filed: Jun. 4, 1990

Related U.S. Application Data

[63] Continuation-in-part of Ser. No. 279,053, Dec. 2, 1988, abandoned.

[30] Foreign Application Priority Data

Dec. 10, 1987 [JP] Japan .................. 62-312544

[51] Int. Cl.⁵ .................. C01B 21/00; B01J 8/00; B01D 53/00
[52] U.S. Cl. .................. 423/235; 423/239; 204/157.3; 204/157.46; 204/157.49; 204/158.2
[58] Field of Search .................. 423/235, 235 D, 239, 423/239 A; 204/157.3, 158.2, 157.46, 157.49

[56] References Cited

U.S. PATENT DOCUMENTS

| | | | |
|---|---|---|---|
| 3,981,815 | 9/1976 | Taniguchi et al. | 252/182 |
| 3,997,415 | 12/1976 | Machi et al. | 204/157.1 H |
| 4,097,349 | 6/1978 | Zenty | 204/158 R |
| 4,294,674 | 10/1981 | Aoki et al. | 204/157.1 H |
| 4,323,759 | 4/1982 | Aoki et al. | 422/62 |
| 4,525,142 | 6/1985 | Gleason et al. | 423/235 |
| 4,585,631 | 4/1986 | Pfeiffer | 423/235 |

FOREIGN PATENT DOCUMENTS

| | | |
|---|---|---|
| 3020301 | 2/1981 | Fed. Rep. of Germany . |
| 835934 | 3/1976 | Japan . |
| 56-136629 | 10/1981 | Japan . |
| 63-104635 | 8/1986 | Japan . |
| 61-174924 | 8/1986 | Japan . |

OTHER PUBLICATIONS

*Chemical Engineering Progress*, (1985), vol. 81, pp. 33-38, "High Efficiency NOx and SOx Removal by Electron Beam", Gleason et al.

*Primary Examiner*—Gregory A. Heiler
*Attorney, Agent, or Firm*—Oblon, Spivak, McClelland, Maier & Neustadt

[57] ABSTRACT

A waste gas containing sulfur oxides ($SO_x$) and/or nitrogen oxides ($NO_x$) is purified by leading the waste gas to a radiation irradiation zone, adding ammonia ($NH_3$) to the waste gas before, during or after the irradiation, collecting the resulting by-product (ammonium sulfate and/or ammonium nitrate) by means of a dust collector, and releasing the purified waste gas into the atmosphere. The amount of $NH_3$ to be added is selected so as to be smaller than an amount calculated from target desulfurization and denitrification efficiencies so that it is possible to reduce the leakage of ammonia despite variations in the composition of the waste gas. Further, an alkaline substance exclusive of ammonia is added to the waste gas either at a position between the electrostatic precipitator and the bag filter or at the upstream side of a reactor outlet or both or within a dust collector or at the upstream side thereof so that the pH of the collected by-product is adjusted to 6 or more, preferably 7 or more, thereby suppressing the adverse effects of sulfamic acid impurities.

17 Claims, 8 Drawing Sheets

METHOD OF TREATING WASTE GAS BY IRRADIATION WITH ELECTRON BEAM

RELATED APPLICATIONS

This application is a continuation-in-part application of U.S. application Ser. No. 07/279,053 filed Dec. 2, 1988, now abandoned.

BACKGROUND OF THE INVENTION

The present invention relates to a method of treating waste gas containing poisonous gas components such as $SO_x$ and/or $NO_x$.

FIG. 1 shows a flow sheet schematically showing a typical process for treating waste gas containing $SO_x$ and/or $NO_x$ which is discharged from a heavy oil combustion furnace or the like to make the waste gas harmless. More specifically, waste gas (generally at 130° C. or more) which is generated from a boiler 1 is introduced through a waste gas duct 2 into a cooling tower 3 where it is cooled down by means of cooling water sprayed from a cooling water supply pipe 4 so that the gas temperature is in the range of from the dew point to 100° C., and the cooled waste gas is then introduced into a reactor 7 through a waste gas duct 5. At the intermediate portion of the duct 5, ammonia is added to the waste gas through a flow control valve 6.

The waste gas introduced into the reactor 7 is irradiated with electron beams from an electron beam generator 9. As a result, the $SO_x$ and/or $NO_x$ contained in the waste gas reacts with ammonia to change into ammonium sulfate and/or ammonium nitrate, which is then removed by means of a dust collector 11, and the purified waste gas is then released into the atmosphere from a smokestack 13. The ammonium sulfate and/or ammonium nitrate removed from the waste gas is collected as a by-product from a discharge pipe 12. It should be noted that, in order to control rise in temperature of the waste gas due to the generation of heat by electron beam irradiation and the generation of heat accompanying desulfurization and/or denitrification and thereby maintain the waste gas at an optimal temperature, the waste gas is sprayed with cooling water in the reactor 7 using cooling water spray means 8 at at least one of the three positions, that is, within the irradiation zone and at the upstream and downstream sides thereof. It is most preferable to spray the waste gas with cooling water after the irradiation (an invention relating thereto was filed as Japanese Patent Application No. 308887/1987).

The dust collector 11 may comprise either an electrostatic precipitator (EP) or a bag filter or both. In the case of using a bag filter alone, since the pressure loss of the waste gas rises within a short period of time, it is necessary to use a bag filter having a relatively large capacity in order to ensure a stable operation, which leads to an increase in the cost.

The reference numerals 14, 15 and 16 in FIG. 1 denote an $SO_x$ analyzer, an $NO_x$ analyzer and a waste gas flowmeter, respectively. The amount of ammonia ($NH_3$) to be added may be calculated from the flow rate of waste gas ($QNm^3/h$), the $SO_x$ concentration ($[SO_x]$ ppm), the $NO_x$ concentration ($[NO_x]$ ppm), the target desulfurization efficiency ($\eta_{SOx}$) and the target denitrification efficiency ($\eta_{NOx}$) as follows:

$$(NH_3) = Q \frac{17.03}{22.41} \cdot 10^{-6}(2[SO_x]\eta_{SOx} + [NO_x]\eta_{NOx}) \text{ kg/h} \quad (1)$$

In order to reduce emission of poisonous components, waste gas treatment equipment has recently been required to meet extremely stringent emission standards, i.e., desulfurization efficiency: 90% or more; denitrification efficiency: 80% or more; and leakage ammonia: 10 ppm or less. It is expected that the emission standards will become increasingly stringent in the future.

However, the above-described prior art method suffers from the disadvantage that it is difficult to control the leakage of ammonia, and another problem may arise in regard to by-products. This will be explained hereinunder more specifically. FIG. 2 is a typical chart showing variations in the $SO_x$ and $NO_x$ concentrations in coal combustion waste gas. The $SO_x$ concentration has variations of about ±100 ppm with respect to an average value of 1500 ppm, while the $NO_x$ concentration has variations of about ±20 ppm with respect to an average value of 300 ppm. The amount of ammonia which is to be added to waste gas in a process wherein the target desulfurization efficiency is 90% and the target denitrification efficiency is 80% is calculated from the expression (1) as follows:

The highest concentration of ammonia to be added =

$$2 \times 1600 \times 0.9 + 320 + 0.8 = 3136 \text{ ppm}$$

The lowest concentration of ammonia to be added =

$$2 \times 1400 \times 0.9 + 280 \times 0.8 = 2744 \text{ ppm}$$

The average concentration of ammonia to be added =

$$2 \times 1500 \times 0.9 + 300 \times 0.8 = 2940 \text{ ppm}$$

Assuming that the allowable leakage ammonia concentration is the aforementioned level, i.e., 10 ppm, it is necessary to feed waste gas having an ammonia concentration in the range of from 2744 ppm to 3136 ppm while controlling the leakage of ammonia with tolerances of ±10 ppm, that is, from 0.3 to 0.4% (i.e., from 10/3136 to 10/2744).

The values of the required control accuracy are considerably lower than those of the presently achievable control accuracy (i.e., from 1 to 2% of the full scale), so that it has heretofore been difficult to control the leakage of ammonia to 10 ppm or less.

When waste gas is irradiated with electron beams, X-rays are partially generated by bremsstrahlung. As is well known, the rate of generation of X-rays by bremsstrahlung is quite small, but, since the range of the generated X-rays is longer than that of electron beams, the X-rays must be shielded by means, for example, of lead or concrete.

FIG. 7 illustrates the structure of a typical irradiation chamber of an apparatus for carrying out the waste gas treating method. In this apparatus, the electron beam irradiation sections 9' of the electron beam accelerator and the reactor 7 are installed in an irradiation chamber 17 made of a shielding material, for example, concrete, as shown in FIG. 7, in order to provide a shield against X-rays resulting from the irradiation with electron beams. A maze (zigzag passage) 19 is defined by the shielding materials, and ducts 5' and 10' for introducing waste gas into the reactor 7 and discharging the gas irradiated with electron beams from the reactor 7 are disposed zigzag fashion along the maze 19, thereby allowing electron beam irradiation to be carried out with a shield provided against X-rays. The maze 19 is generally arranged in such a manner that the passage includes two or three right angle formations, thereby preventing X-rays from leaking out of the irradiation chamber 17.

X-rays that penetrate into the shielding material decay therein but some of them are reflected. The intensity of the reflected X-rays is exceedingly weak, i.e., one/hundredth to one/thousandth of their original intensity. Accordingly, it is possible to provide an effective shield against X-rays by means of a maze having a structure in which an integral passage includes two or three right angle formations.

The waste gas that contains dust particles of a by-product produced by the irradiation with electron beams is introduced into the by-product dust collector 11 outside the irradiation chamber 17 through the maze-like duct 10 having such a structure that the duct includes two or three right angle formations. Inside this maze-like duct, particularly the portions which are formed into right angles, adhesion and deposition of dust are found to occur, and these lead to an increase in pressure loss of the waste gas being treated and unstable operation.

The by-products, which consist mainly of ammonium sulfate and ammonium nitrate, represent a useful nitrogen fertilizer but, when the CO concentration in waste gas is below 10 times the $SO_x$ concentration, sulfamic acid, which is harmful to plants, is generated, and although the content of sulfamic acid is very low, i.e., several percent, the fertilizer formed from the by-products, inhibits the growth of plants [the present applicant has already filed a method of removing sulfamic acid compounds by thermal cracking under Japanese Patent Application No. 61-279791 (1986)].

The present inventors conducted various studies in order to reduce the leakage of ammonia and modify the by-products without lowering either the desulfurization efficiency or the denitrification efficiency. As a result, we have found that it is possible to attain this objective by adding an amount of ammonia which is smaller than that which is needed to achieve target desulfurization and denitrification efficiencies and further adding an alkaline substance exclusive of ammonia to remove the $SO_x$ and $NO_x$ which are left unreacted due to lack of ammonia, thereby modifying the by-product while maintaining the overall desulfurization and denitrification efficiencies at high levels.

It is also possible to substantially inhibit adverse effects of sulfamic acid impurities by adjusting the pH of the collected by-product to 6 or more, preferably 7 or more.

SUMMARY OF THE INVENTION

The present invention provides a method of treating waste gas by irradiation with radiation which includes the steps of leading a waste gas containing sulfur oxides ($SO_x$) and/or nitrogen oxides ($NO_x$) to an irradiation zone, adding ammonia ($NH_3$) to the waste gas within the irradiation zone or at the upstream or downstream sides thereof, collecting the resulting ammonium sulfate and/or ammonium nitrate by means of a dust collector, and releasing the purified waste gas into the atmosphere, wherein the improvement comprises adding an amount of ammonia which is smaller than a stoichiometric amount and further adding an alkaline substance exclusive of ammonia to the waste gas within the dust collector or at the upstream side thereof.

BRIEF DESCRIPTION OF THE DRAWINGS

FIG. 8-B is a chart showing that an increase in pressure loss of the waste gas in the bag filter was found in Comparative Example 1.

DETAILED DESCRIPTION OF THE PREFERRED EMBODIMENT

Figure 3:
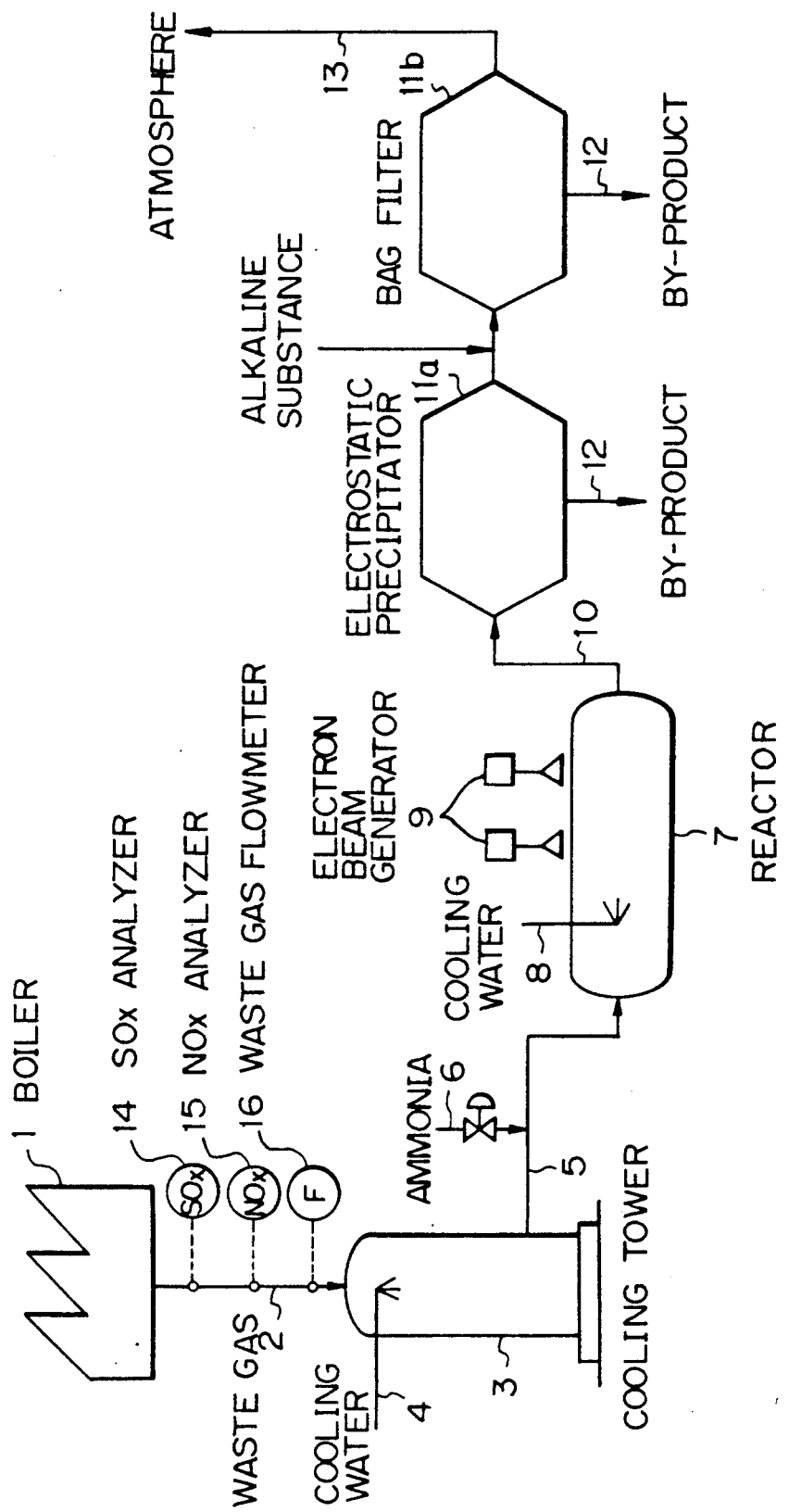
FIG. 3 is a flow sheet illustrating one embodiment of the present invention.

FIG. 3 is a flow sheet illustrating one embodiment of the method according to the present invention, wherein a combination of an electrostatic precipitator and a bag filter is used as a dust collector (see U.S. patent application Ser. No. 055,969, June 1987).

Figure 1:
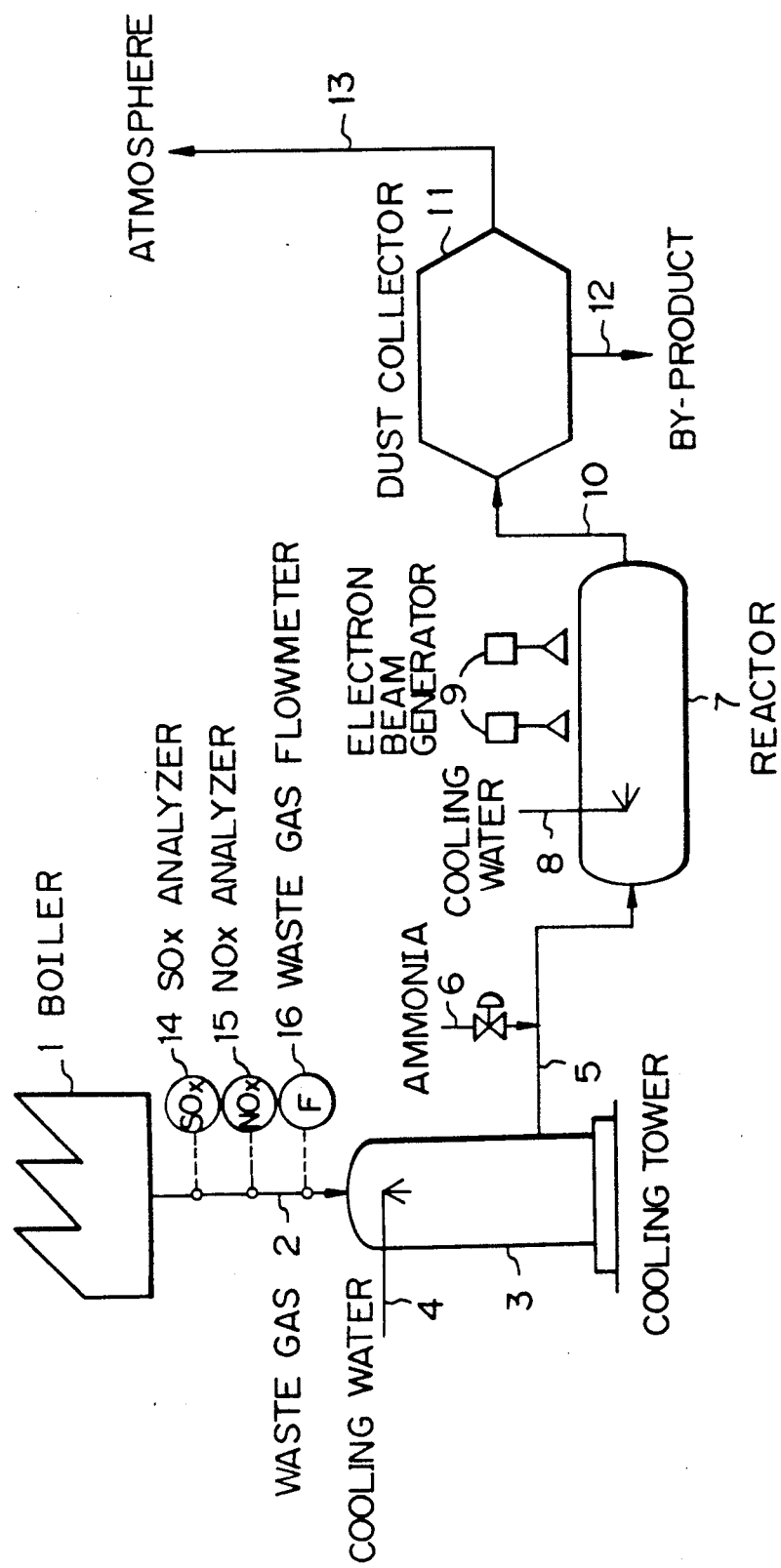
FIG. 1 is a flow sheet illustrating a prior art.
Figure 2:
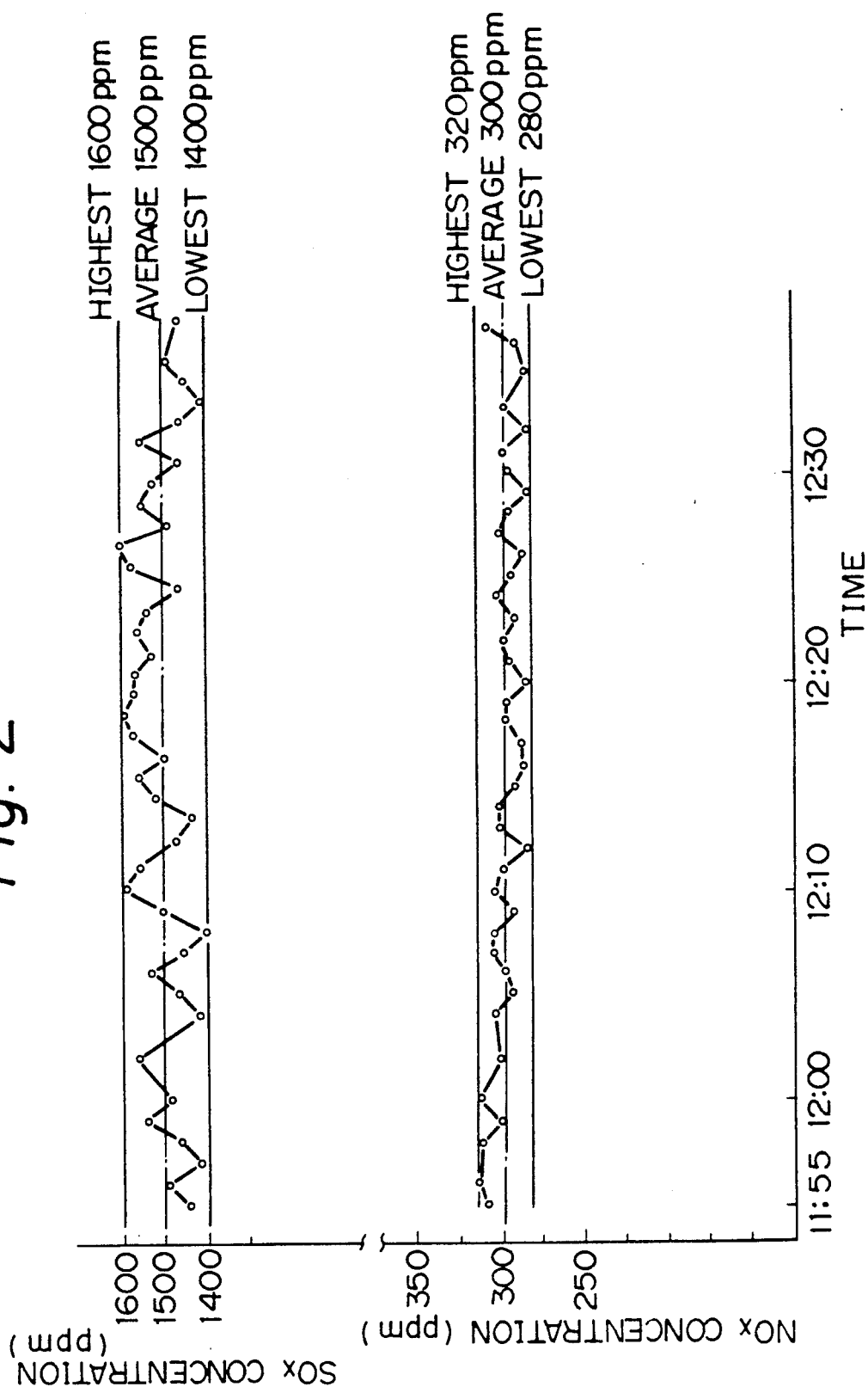
FIG. 2 is a chart showing variations in concentration of $SO_x$ and $NO_x$ in waste gas.

A stoichiometric concentration of ammonia to be added is calculated from the aforementioned expression (1), but the actual concentration of ammonia added ranges from 65% to 100% in accordance with the $SO_x$ and $NO_x$ concentration variation patterns. More specifically, the greater part of desulfurization and denitrification is substantially effected by ammonia, which has a relatively high reaction rate. The amount of ammonia to be added is preferably selected on the basis of the lowest concentration in each concentration variation pattern. In the case of the concentration variation patterns shown in FIG. 2, the lowest concentration of $SO_x$ is 1400 ppm, while the lowest concentration of $NO_x$ is 280 ppm, and therefore the concentration of ammonia to be added is 2744 ppm, as described above. On the other hand, the stoichiometric concentration with respect to the highest concentrations of $SO_x$ and $NO_x$ is 3136 ppm. Therefore, the ratio of the actual concentration of ammonia added to the stoichiometric concentration ranges from 87.5% to 100% (i.e., from 2744/3136 to 2744/2744).

Figure 5:
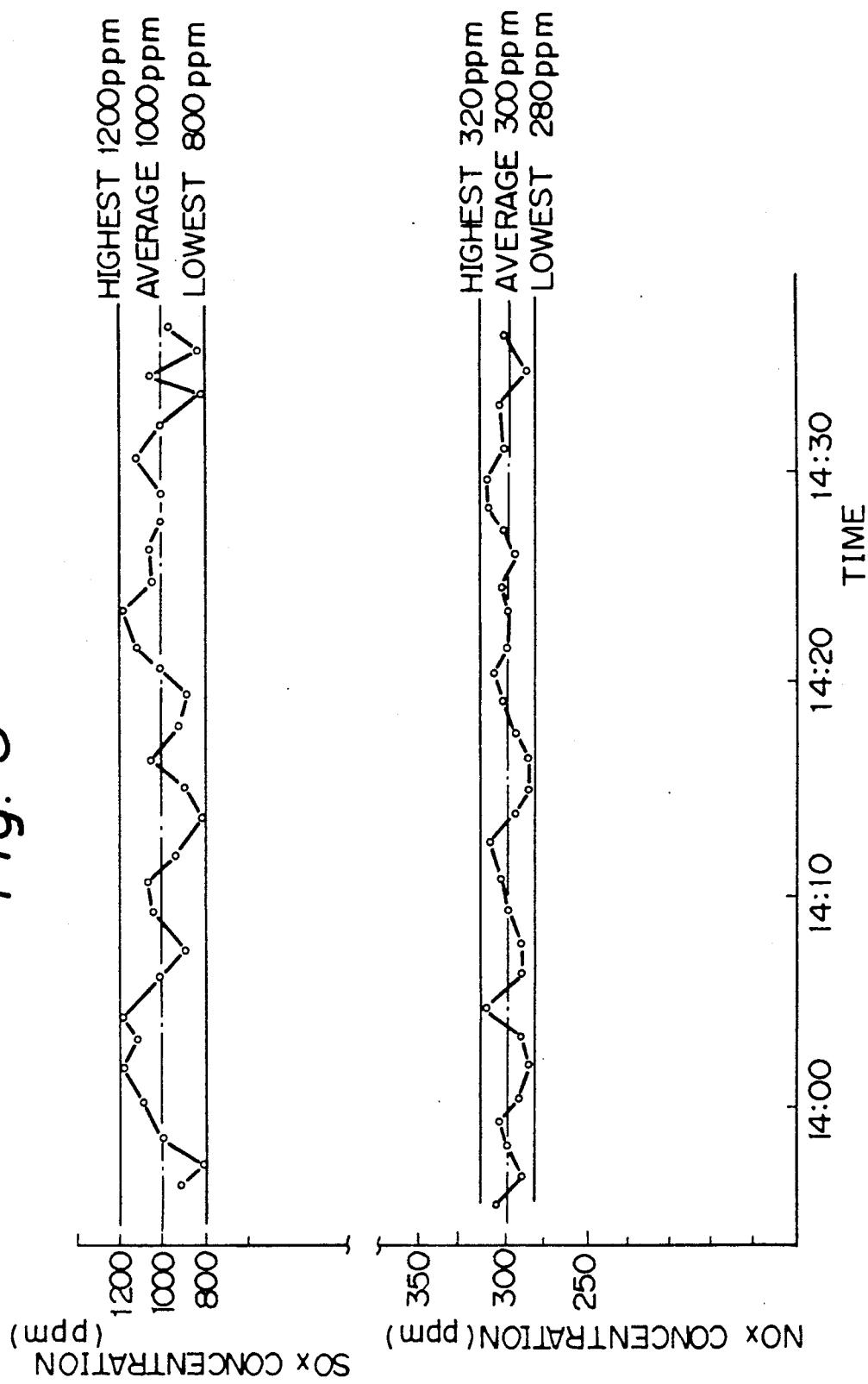
FIG. 5 is a chart showing variations in concentration of $SO_x$ and $NO_x$ in waste gas which has relatively large concentration variations.

FIG. 5 is a chart showing variations in concentration of $SO_x$ and $NO_x$ in waste gas which has relatively large concentration variations, wherein the highest concentrations of $SO_x$ and $NO_x$ are 1200 ppm and 320 ppm, respectively, while the lowest concentrations of $SO_x$ and $NO_x$ are 800 ppm and 280 ppm, respectively. Assuming that the target desulfurization efficiency is 90% and the target denitrification efficiency 80%, the concentration of ammonia to be added is calculated from the expression (1) as follows:

The highest stoichiometric concentration =

$$2 \times 1200 \times 0.9 + 320 \times 0.8 = 2416 \text{ (ppm)}$$

-continued

The lowest stoichiometric concentration =

$$2 \times 800 \times 0.9 + 280 \times 0.8 = 1644 \text{ (ppm)}$$

Accordingly, if ammonia is added on the basis of the lowest stoichiometric concentration, the ratio of the actual concentration of ammonia added to the stoichiometric concentration ranges from 68.9% to 100% (i.e., from 1664/2416 to 1664/1664).

The addition of an alkaline substance exclusive of ammonia in the present invention is carried out within the dust collector or on the upstream side thereof. The added alkaline substance reacts with unreacted $SO_x$ and $NO_x$ mainly within the dust collector to thereby remove these poisonous gas components. As the above-described alkaline substance, it is preferable to employ one selected from among inorganic salts formed from calcium, sodium, potassium and magnesium, more specifically, $Ca(OH)_2$, $CaO$, $CaCO_3$, $Na_2CO_3$, $NaHCO_3$, $Mg(OH)_2$, etc., or a mixture thereof. The amount of alkaline substance added is preferably selected so as to be equal to or more than an amount (equimolecular amount) which is determined on the basis of the concentrations of undesulfurized $SO_x$ and undenitrified $NO_x$.

In the arrangement shown in FIG. 3, an alkaline substance in the form of a powder with a particle size less than 250 μm is added to the waste gas at a position between the electrostatic precipitator 11a and the bag filter 11b and this alkaline substance is uniformly retained over the bag filter 11b. Since the waste gas passes through the filter 11b from the obverse side to the reverse side in such a manner as to be filtered therethrough, the unreacted $SO_x$ and $NO_x$ in the waste gas come into contact and react uniformly with the alkaline substance retained on the filter 11b and these poisonous gas components are effectively removed.

Figure 4:
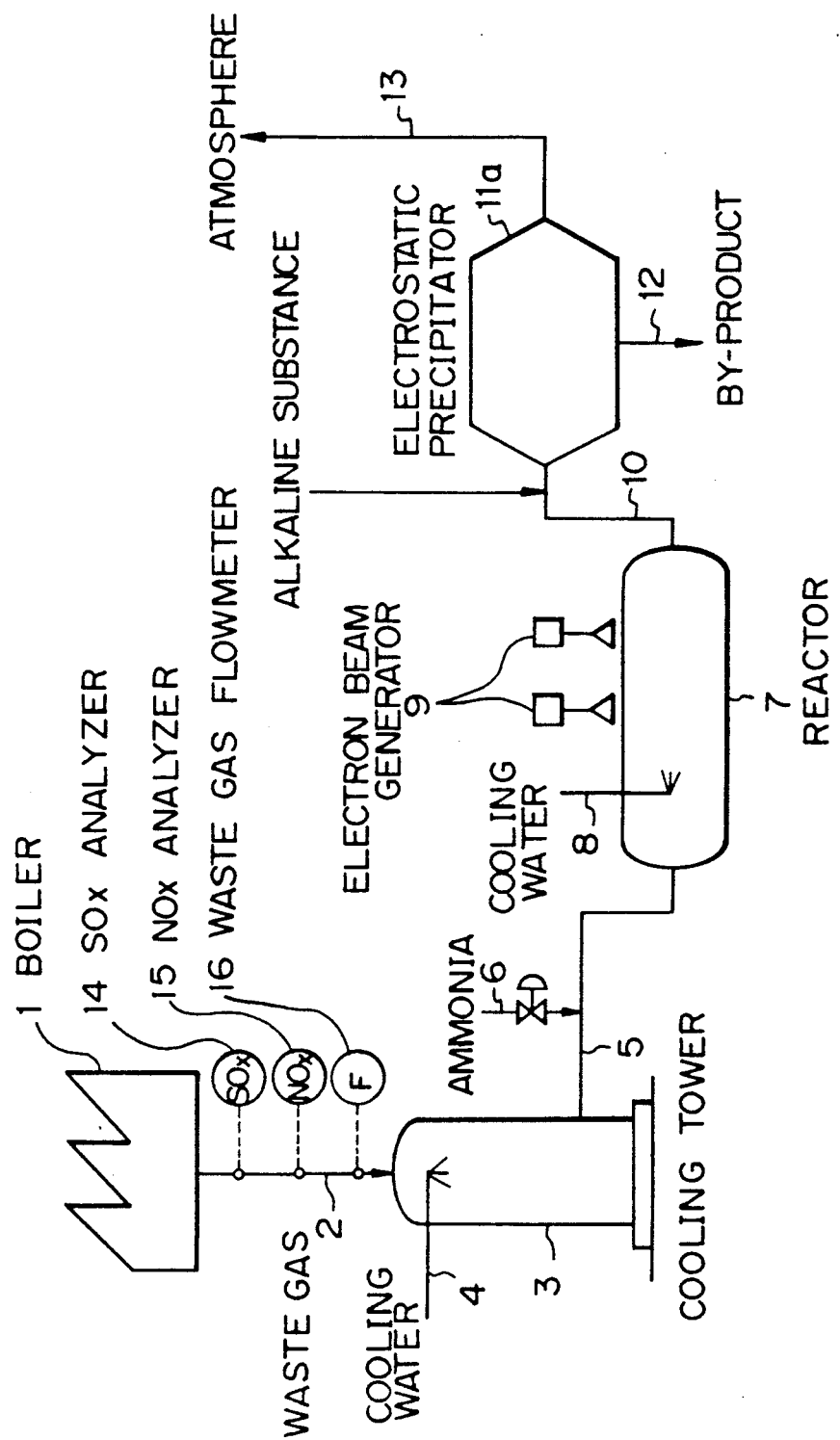
FIG. 4 is a flow sheet illustrating another embodiment of the present invention.

FIG. 4 is a flow sheet illustrating another embodiment of the method according to the present invention, wherein the electrostatic precipitator 11a is used alone. This embodiment is basically the same as the first embodiment which has been described above with reference to FIG. 3. Unreacted $SO_x$ and $NO_x$ are allowed to react with an alkaline substance added at the upstream side of the electrostatic precipitator 11a mainly within the electrostatic precipitator 11a or, if necessary, within a reactor (not shown) which is additionally provided at the upstream side of the electrostatic precipitator 11a. The addition of an alkaline substance may be carried out on the upstream side of the electrostatic precipitator 11a at any of the three positions, that is, within the waste gas irradiation zone and at the upstream and downstream sides thereof since salts which are produced as products of the reaction of the alkaline substance with $SO_x$ and $NO_x$ are collected in the form of a mixture of ammonium sulfate and ammonium nitrate. However, it is most preferable to add an alkaline substance to the waste gas after the irradiation. It is also preferable to carry out the addition of an alkaline substance at two or more of the above-described three positions. In these cases, the form of alkaline substance added is not necessarily limited to a powder form and it may be in the form of an aqueous solution. Since cooling water is used to adjust the temperature of waste gas as described above, if the alkaline substance is dissolved in the cooling water in advance, it is unnecessary to additionally provide a feed means for the alkaline substance. The addition of the aqueous alkaline solution may be carried out at any of the three positions, that is, within the irradiation zone or at the upstream (i.e., the cooling water pipe 8 shown in FIG. 4) or downstream sides thereof, and it may also be conducted within the cooling tower 3. It should be noted that, in the case where the bag filter is used alone, the arrangement is basically the same as that of the embodiment shown in FIG. 4.

Pure ammonium sulfate and ammonium nitrate are well known to have a pH of 5.5 and 5.43, respectively and that they are rather acidic. If the excess ammonia is used to neutralize $SO_x$ and $NO_x$ in the waste gas, the pH of the collected by-product is 5.5 or less, and the excess ammonia is discharged as leakage ammonia. The pH of the by-product collected in the electrostatic precipitator (EP) in Example 1 is less than 3 as described therein.

In the foregoing process, it is preferable to add an alkaline substance in such an amount that the pH of the collected by-product is 6 or more, preferably 7 or more. This is because it is possible to inhibit adverse effects on plants by increasing the amount of alkaline substance added even if the by-product contains several percent of a sulfamic acid compound which is harmful to plants.

The addition of an alkaline substance is also effective to reduce the rise in pressure loss of waste gas in the case of using a bag filter alone. More specifically, the by-products (including ammonium sulfate and ammonium nitrate) resulting from the irradiation are in the form of considerably fine particles which are very adherent, coherent and hygroscopic. Therefore, it may be considered that the particles of by-product will become agglomerated on the surface of the bag filter and thereby clog it within a short period of time, thus causing a rise in the pressure loss. However, if an alkaline substance is added, salts which are produced as reaction products mainly form nuclei and fine particles of ammonium sulfate and ammonium nitrate agglomerate around these nuclei to become coarse. The resulting coarse particles are captured on the filter surface and can then be readily released from it. Accordingly, there is no fear of the filter cloth becoming clogged, and the rise in the pressure loss is prevented.

The amount of alkaline substance to be added will depend on the concentrations of $SO_x$ and $NO_x$ and the target desulfurization and denitrification efficiencies but it is preferably selected to fall in the range of from 1.0% to 10% in the weight ratio terms with respect to the by-product.

Exemplary forms of radiation which are usable in the method of the present invention include electron beams, beta rays, gamma rays, alpha rays, X-rays and neutron rays. It is preferable to employ electron beams emitted from an electron beam generator.

Hereinunder, the present invention will be described more specifically by way of Examples. However, the present invention is in no way restricted to these Examples.

EXAMPLE 1

Figure 8A:
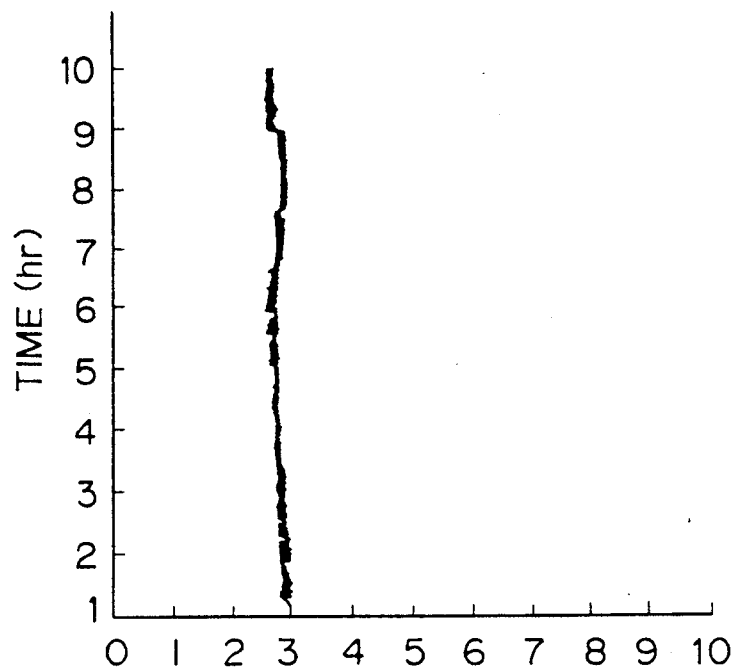
FIG. 8-A is a chart showing that virtually no increase in pressure loss of the waste gas in the bag filter was found according to the present invention in Example 1.
Figure 8B:
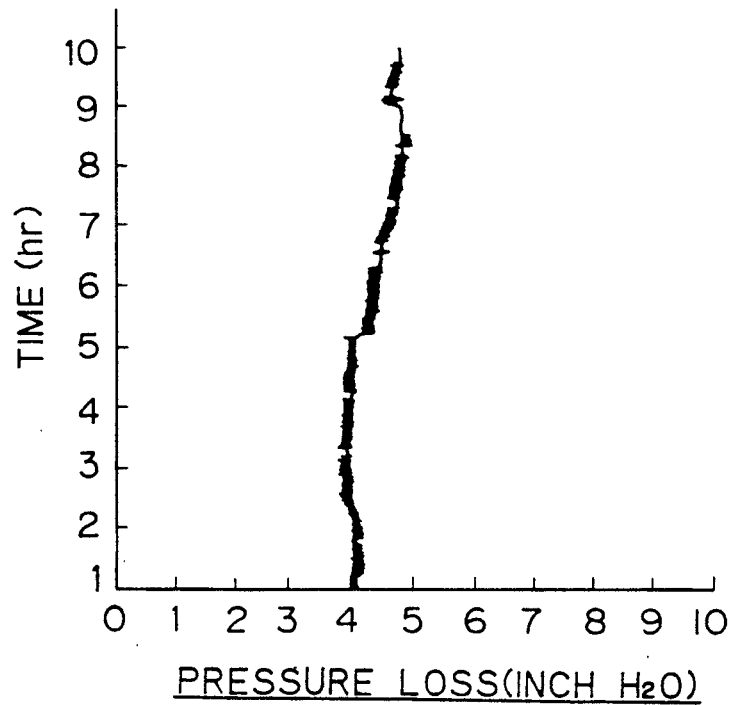

The following experiment was conducted so as to achieve a desulfurization efficiency of 90% and a denitrification efficiency of 80% using an experimental apparatus having the arrangement shown in FIG. 3. More specifically, a waste gas having a gas temperature of 130° C., an average $SO_x$ concentration of 1500 ppm, an average $NO_x$ concentration of 300 ppm (variations of each concentration being shown in FIG. 2) and a CO concentration of 25 ppm was cooled down to 70° C. in the cooling tower 3. Thereafter, ammonia (2700 ppm) was added to the waste gas and the mixture was then introduced into the reactor 7 where it was irradiated with electron beams of 1.8 Mrad. Water was sprayed from the cooling water spray means 8 so that the gas temperature at the outlet of the bag filter 11b was adjusted to 70° C. After the greater part of the by-product had been collected in the electrostatic precipitator 11a, Ca(OH)$_2$ powder with an average particle size of about 100 μm was added at a rate of 2.9 kg/h to the waste gas at the inlet of the bag filter 11b. The amount of Ca(OH)$_2$ added is selected so as to be adequate to react with these unreacted gas components. A continuous operation was carried out for 8 hours. After the operation, virtually no pressure loss of the waste gas in the bag filter was found as shown in FIG. 8-A. The respective concentrations of $SO_x$, $NO_x$ and ammonia were measured at the outlet of the electrostatic precipitator 11a and at the outlet of the bag filter 11b and desulfurization and denitrification efficiencies were calculated from the numerical values simultaneously obtained from the $SO_x$ and $NO_x$ analyzers 14 and 15, respectively. It should be noted that about 2 minutes was required for each of the analyzers to complete an operation of detecting the gas concentration and converting it to an electrical signal. The pH of the by-products collected in the electrostatic precipitator (EP) 11a was about 2.7. The results of the experiment are shown in Table 1 below.

TABLE 1

|  | Desulfurization efficiency | Denitrification efficiency | Ammonia conc. |
| --- | --- | --- | --- |
| EP outlet | 78–89% | 80% | ≈0 ppm |
| Bag filter outlet | 90% | 81% | ≈0 ppm |

COMPARATIVE EXAMPLE 1

An experiment was conducted using the same apparatus and under the same conditions as in Example 1 except that ammonia was added in the range of from 2744 to 3136 ppm (the target desulfurization and denitrification efficiencies being 90% and 80%, respectively) and no Ca(OH)$_2$ was added at the inlet of the bag filter 11b. The rise in pressure loss in the bag filter increased approximately linearly relative to elapse of the operation time, and after 8 hours operation, the rise of the pressure loss was about 25 mmH$_2$O (1 inch H$_2$O) as shown in FIG. 8-B. The results are shown in Table 2 below.

TABLE 2

|  | Desulfurization efficiency | Denitrification efficiency | Ammonia conc. |
| --- | --- | --- | --- |
| EP outlet | ≈88% | 80% | 0–50 ppm |
| Bag filter outlet | 88–90% | 81% | 0–30 ppm |

EXAMPLE 2

An experiment was conducted under the same conditions as in Example 1 except that an experimental apparatus having the arrangement shown in FIG. 4 was used and Ca(OH)$_2$ powder with the average particle size of about 150 μm was added at the inlet of the electrostatic precipitator 11a. The respective concentrations of $SO_x$, $NO_x$ and ammonia in the waste gas at the outlet of the electrostatic precipitator 11a before and after the addition of Ca(OH)$_2$ were measured, and desulfurization and denitrification efficiencies were calculated from the numerical values obtained from the concentrations of $SO_x$ and $NO_x$ in the waste gas at the inlet of the system which were measured at the same time. A continuous operation was carried out for 8 hours. After the 8 hours operation, the rise in pressure loss of the waste gas in the duct from the outlet of the reactor to the inlet of the EP was about 37.5 mmH$_2$O (1.5 inch H$_2$O). It should be noted that the pH of the by-product was about 3. The results of the experiment are shown in Table 3 below.

TABLE 3

|  | Desulfurization efficiency | Denitrification efficiency | Ammonia conc. |
| --- | --- | --- | --- |
| Before addition of Ca(OH)$_2$ | 78–89% | 80% | ≈0 ppm |
| After addition of Ca(OH)$_2$ | 90% | 81% | ≈0 ppm |

EXAMPLE 3

An experiment was conducted using the same experimental apparatus and under the same conditions as in Example 2 except that the rate of addition of Ca(OH)$_2$ was raised to 4.6 kg/h. As a result, the amount of by-product collected was 65 kg/h, that is, 2.6% (1.7 kg/h) better than that in Example 2, and the pH of the by-product was about 7. The desulfurization efficiency and the denitrification efficiency were the same as in Example 2.

EXAMPLE 4

Germination tests of Brassica campestris, a kind of Chinese cabbage, were conducted using the by-products obtained in Examples 3 and 6 (described later), and the results of the tests were compared with those of the by-products (pH=3) formed in Example 1 and a commercially available compound fertilizer consisting of ammonium sulfate and ammonium nitrate. The results are shown in Table 4 below.

TABLE 4

| No. | Fertilizers | Sulfamic acid content | pH | Results of test |
| --- | --- | --- | --- | --- |
| 1 | By-products of Examples 3 and 6 | 4.8 wt % | — | Similar to No. 3 Excellent growth |
| 2 | By-product collected in EP in Example 1 | 3.8 wt % | 2.7 | Germination rate and plant weight lowered considerably in comparison with Nos. 1 and 3 |
| 3 | Commercially available compound fertilizer | 0 wt % | — | Excellent growth |

It will be understood from the results shown above that the adverse effects of sulfamic acid were suppressed in No. 1 since the pH was effectively adjusted.

EXAMPLE 5

Figure 6:
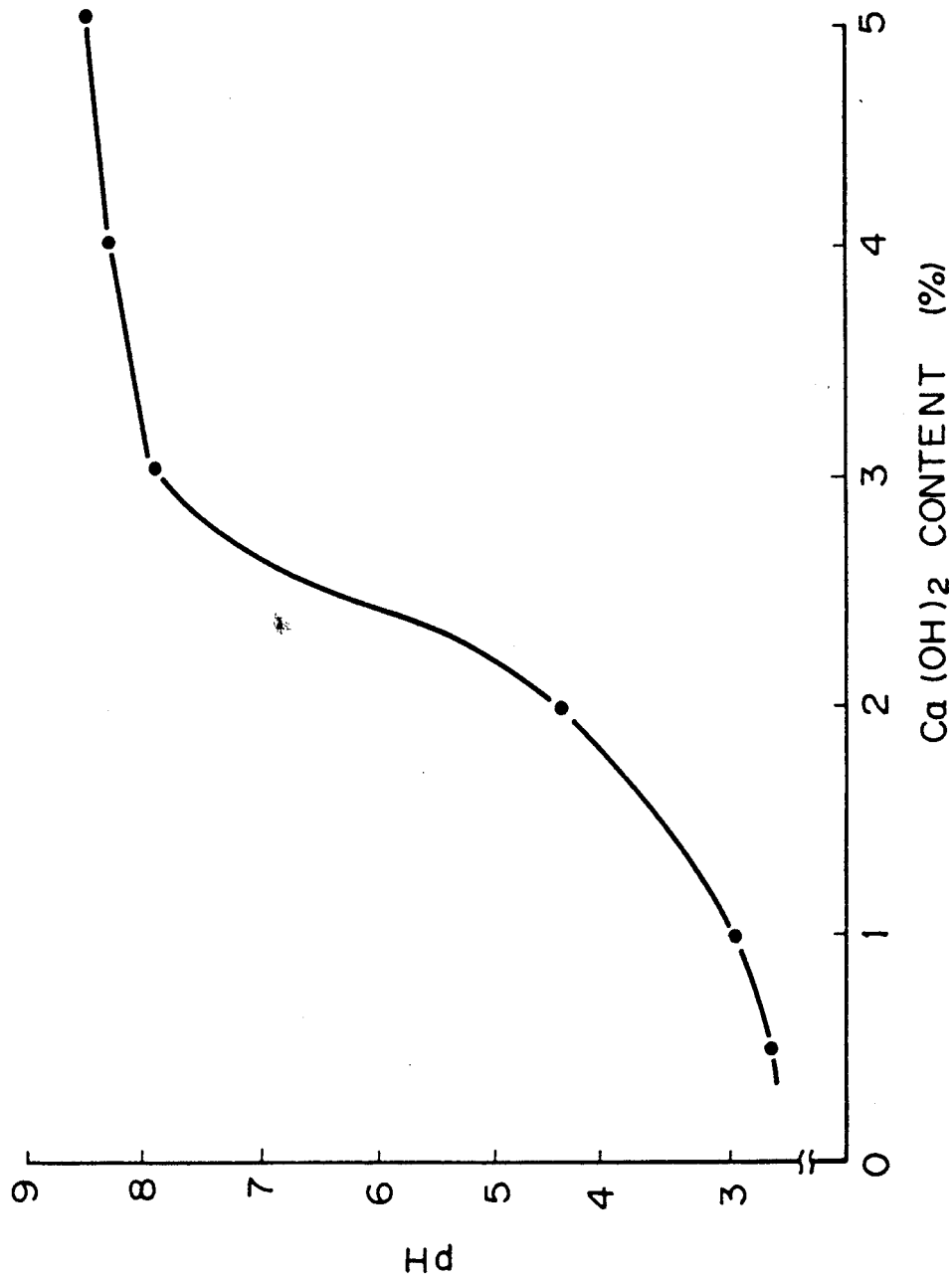
FIG. 6 is a graph showing the relationship between the $Ca(OH)_2$ content and the pH of the by-product.
Figure 7:
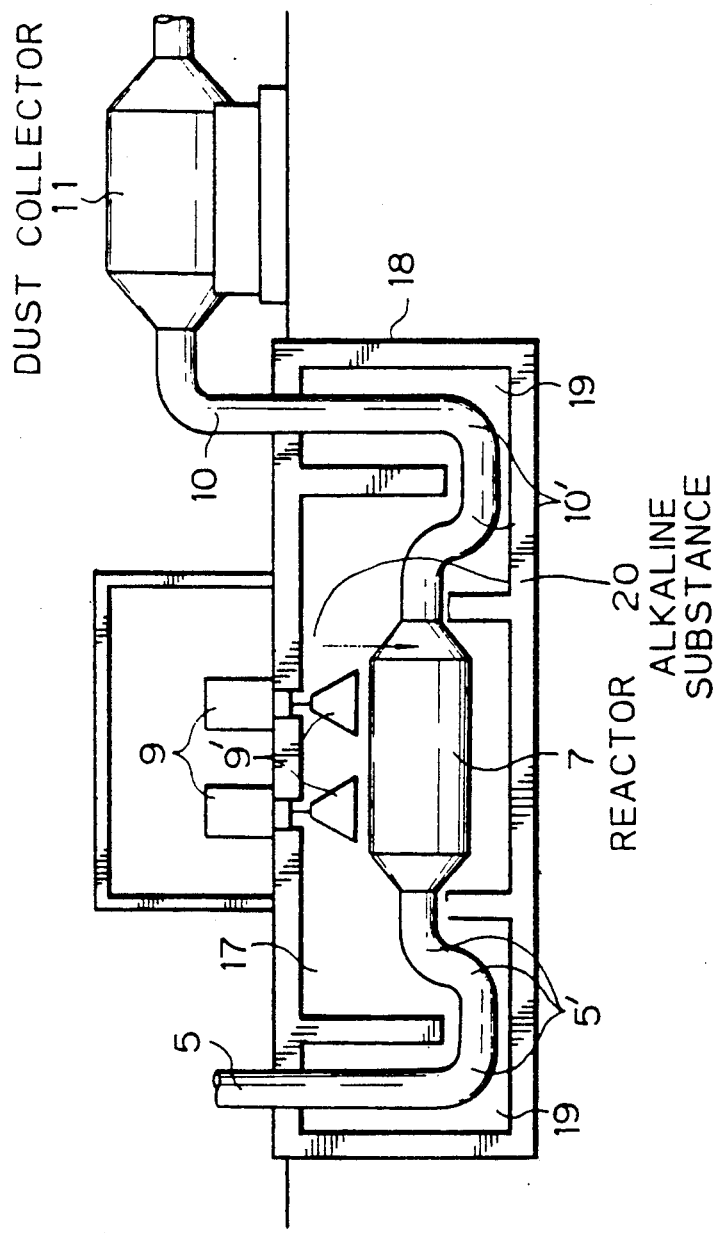
FIG. 7 illustrates the structure of a typical electron beam irradiation chamber.

Ca(OH)$_2$ powder with an average particle size of about 150 μm was added to the by-product collected in EP in Example 1 in the following various amounts, that is, 0.5 wt %, 1.0 wt %, 2.0 wt %, 3.0 wt %, 4.0 wt % and 5.0 wt %, and the pH values of the by-products formed in each case were measured. The results of this measurement are shown in FIG. 6. The results show that it was necessary to add about 2.6 wt % of Ca(OH)2 in order to adjust the pH of the by-products to 7.

EXAMPLE 6

An experiment was conducted using an experimental apparatus having the same arrangement as that shown in FIG. 4 except that a bag filter alone was used as a dust collector. A waste gas having a gas temperature of 130° C., an average $SO_x$ concentration of 1500 ppm, an average $NO_x$ concentration of 300 ppm and a CO concentration of 25 ppm was cooled down to 70° C. in the cooling tower 3. Thereafter, ammonia (2744–3136 ppm) was added to the waste gas. The variations in concentration of $SO_x$ and $NO_x$ were similar to those shown in FIG. 2, and an amount of ammonia adequate to achieve $\eta_{SO_x} = 90\%$ and $\eta_{NO_x} = 80\%$ was added. Then, the mixture was introduced into the reactor 7 where it was irradiated with electron beams of 1.8 Mrad. Water was sprayed from the cooling water spray means 8 disposed at the upstream side of the electron beam irradiation zone so that the gas temperature at the outlet of the bag filter was adjusted to 70° C. The desulfurization and denitrification efficiencies and $NH_3$ concentration in the waste gas at the outlet of the bag filter were as shown in Table 5 below.

TABLE 5

|  | Desulfurization efficiency | Denitrification efficiency | $NH_3$ |
|---|---|---|---|
| Bag filter outlet | 88–90% | 81% | 0–30 ppm |

The pH of the by-products collected in the bag filter was about 3. About 2.6 wt % of $Ca(OH)_2$ was added to the by-products so that the pH was adjusted to 7.

EXAMPLE 7

An experiment was conducted using the same apparatus under the same conditions as in Example 2 except that $Ca(OH)_2$ powder with an average particle size of about 150 μm was further added immediately after the outlet of the reactor. The amount of the alkali substance added was about equal to an amount determined on the basis of the concentration of $SO_x$ and $NO_x$, which were left unreacted due to a lack of ammonia. After the 8 hours operation, virtually no rise in pressure loss was found in the duct from the outlet of the reactor to the inlet of the EP. The results of the desulfurization efficiency, the denitrification efficiency and ammonia conc. are the same as those of Example 2.

As has been described above, it is possible according to the present invention to obtain about 90% or more of desulfurization efficiency and about 80% or more of denitrification efficiency, and also to reduce the leakage of ammonia despite variations in the composition of a waste gas. Even if the by-products contain several percent of sulfamic acid impurities, it is possible to suppress the adverse effects thereof by adding an alkaline substance exclusive of ammonia so that the pH of the collected by-product is adjusted to 6 or more, preferably 7 or more.

Further, it is possible according to the present invention to inhibit an increase in pressure loss of the waste gas in the bag filter by adding an alkaline substance in the form of a powder with a particle size less than 250 μm and exclusive of ammonia to the waste gas at the position between the EP and the bag filter.

Furthermore, it is possible according to the present invention to inhibit an increase in pressure loss of the waste gas in the maze from the outlet of the reactor by adding the aforementioned alkaline substance at the position of the upstream side of a reactor outlet and to thereby enable stable operation of the waste gas treating process.

An amount of $SO_3$ ions in the by-product was measured and it was found to be as low as 0.1 wt % or less. Thus, it is presumed that $CaSO_3.\frac{1}{2}H_2O$ formed from the reaction of $SO_2$ with $Ca(OH)_2$ may be oxidized with acidic substances in the by-product to be converted to stable gypsum, $CaSO_4.2H_2O$.

The present invention provides great industrial benefits since it is possible to carry out the present invention without the need to impart special changes or modifications to conventional systems.

What is claimed is:

1. A process for treating waste gas containing nitrogen or sulfur oxides, comprising the steps of:
   leading a waste gas containing sulfur oxides, nitrogen oxides or a mixture thereof to a radiation irradiation zone;
   adding ammonia to the waste gas before, during or after the irradiation to produce a by-product comprising ammonium sulfate, ammonium nitrate or mixture thereof, and a purified waste gas, wherein the amount of $NH_3$ to be added is in the range of from 65 to 100% on the basis of the lowest concentration in the concentration variation patterns of the $SO_x$ and $NO_x$;
   collecting the resulting by-product by means of a dust collector comprising a combination of an electrostatic precipitator and a bag filter;
   adding an alkaline substance in the form of a powder with a particle size of less than 250 μm and exclusive of ammonia to the waste gas wherein the amount of the alkaline substance added is equal to or more than an amount determined on the basis of the concentrations of $SO_x$ and $NO_x$ which are left unreacted due to a lack of ammonia at a position between the electrostatic precipitator and the bag filter; and
   releasing the purified waste gas into the atmosphere.

2. The method according to claim 1, wherein said alkaline substance is an inorganic salt formed from calcium, sodium, potassium or magnesium, or a mixture thereof.

3. The method according to claim 1, wherein said alkaline substance is one selected from the group consisting of calcium hydroxide, calcium oxide, sodium carbonate, sodium hydrogen carbonate, magnesium hydroxide and calcium carbonate.

4. The method according to claim 1, wherein the pH of the collected by-product from the electrostatic precipitator is adjusted to 6 or more by adding said alkaline substance which is one selected from the group consisting of calcium hydroxide, calcium oxide, sodium carbonate, sodium hydrogen carbonate, magnesium hydroxide and calcium carbonate.

5. The method according to claim 1, wherein the pH of the collected by-product from the electrostatic precipitator is adjusted to 7 or more by adding said alkaline substance which is one selected from the group consisting of calcium hydroxide, calcium oxide, sodium carbonate, sodium hydrogen carbonate, magnesium hydroxide and calcium carbonate.

6. The method according to claim 1, wherein said radiation is an electron beam applied from an electron beam accelerator.

7. A process for treating waste gas containing nitrogen or sulfur oxides, comprising the steps of:

leading a waste gas containing sulfur oxides, nitrogen oxides or a mixture thereof to a radiation irradiation reactor;

adding ammonia to the waste gas before, during or after the irradiation to produce a by-product comprising ammonium sulfate, ammonium nitrate or mixture thereof, and a purified waste gas, wherein the amount of $NH_3$ to be added is in the range of from 65 to 100% on the basis of the lowest concentration in the concentration variation patterns of the $SO_x$ and $NO_x$;

collecting the resulting by-product by means of a dust collector comprising either an electrostatic precipitator or a bag filter or both;

adding an alkaline substance in the form of a powder with a particle size of less than 250 μm and exclusive of ammonia to the waste gas wherein the amount of the alkaline substance added is equal to or more than an amount determined on the basis of the concentrations of $SO_x$ and $NO_x$ which are left unreacted due to a lack of ammonia at the upstream side of said reactor outlet; and releasing the purified waste gas into the atmosphere.

8. The method according to claim 7, wherein said alkaline substance is one selected from the group consisting of calcium hydroxide, calcium oxide, sodium carbonate, sodium hydrogen carbonate, magnesium hydroxide and calcium carbonate.

9. The method according to claim 7, wherein the pH of the collected by-product from the electrostatic precipitator is adjusted to 6 or more by adding said alkaline substance which is one selected from the group consisting of calcium hydroxide, calcium oxide, sodium carbonate, sodium hydrogen carbonate, magnesium hydroxide and calcium carbonate.

10. The method according to claim 7, wherein the pH of the collected by-product from the electrostatic precipitator is adjusted to 7 or more by adding said alkaline substance which is one selected from the group consisting of calcium hydroxide, calcium oxide, sodium carbonate, sodium hydrogen carbonate, magnesium hydroxide and calcium carbonate.

11. The method according to claim 7, wherein said dust collector comprises a combination of an electrostatic precipitator and a bag filter, and said alkaline substance is further added to the waste gas at a position between the electrostatic precipitator and the bag filter.

12. The method according to claim 11, wherein said alkaline substance is an inorganic salt formed from calcium, sodium, potassium or magnesium, or a mixture thereof.

13. The method according to claim 7, wherein said alkaline substance is added to the by-product in an amount of from 1.0 wt % to 10 wt %.

14. A process for treating waste gas containing nitrogen or sulfur oxides, comprising the steps of:

leading a waste gas containing sulfur oxides, nitrogen oxides or a mixture thereof to a radiation irradiation zone;

adding ammonia to the waste gas before, during or after the irradiation to produce a by-product comprising ammonium sulfate, ammonium nitrate or mixture thereof, and a purified waste gas, wherein the amount of ammonia added is in the range of from 65 to 100% on the basis of the lowest concentration in the concentration variation patterns of the $SO_x$ and $NO_x$;

collecting the resulting by-product by means of a dust collector;

adding an alkaline substance exclusive of ammonia to the waste gas within said dust collector or at the upstream side thereof so that the pH of the collected by-product is 6 or more; and releasing the purified waste gas into the atmosphere.

15. The method according to claim 14, wherein said alkaline substance is an inorganic salt formed from calcium, sodium, potassium or magnesium, or a mixture thereof.

16. The method according to claim 14, wherein said alkaline substance is one selected from the group consisting of calcium hydroxide, calcium oxide, sodium carbonate, sodium hydrogen carbonate, magnesium hydroxide and calcium carbonate.

17. The method according to claim 14, wherein the pH of the collected by-product from the electrostatic precipitator is adjusted to 7 or more by adding said alkaline substance which is one selected from the group consisting of calcium hydroxide, calcium oxide, sodium carbonate, sodium hydrogen carbonate, magnesium hydroxide and calcium carbonate.

* * * * *